(12) United States Patent
Morgan et al.

(10) Patent No.: US 7,298,598 B1
(45) Date of Patent: Nov. 20, 2007

(54) WIRING DEVICE WITH MULTI-SHOT MISWIRE

(75) Inventors: Kent Morgan, Groton, NY (US); Jeffrey C. Richards, Baldwinsville, NY (US); Thomas N. Packard, Syracuse, NY (US)

(73) Assignee: Pass & Seymour, Inc, Syracuse, NY (US)

( * ) Notice: Subject to any disclaimer, the term of this patent is extended or adjusted under 35 U.S.C. 154(b) by 223 days.

(21) Appl. No.: 11/237,399

(22) Filed: Sep. 28, 2005

Related U.S. Application Data

(63) Continuation-in-part of application No. 10/884,304, filed on Jul. 2, 2004, now Pat. No. 7,133,266, and a continuation-in-part of application No. 11/103,722, filed on Apr. 12, 2005, now Pat. No. 7,212,386, and a continuation-in-part of application No. 10/900,769, filed on Jul. 28, 2004, now Pat. No. 7,154,718.

(51) Int. Cl.
*H02H 3/02* (2006.01)
*G01R 31/02* (2006.01)
(52) U.S. Cl. ........................ 361/45; 324/424
(58) Field of Classification Search ................ 361/42, 361/45, 77; 307/127; 324/424, 521
See application file for complete search history.

(56) References Cited

U.S. PATENT DOCUMENTS

| | | | |
|---|---|---|---|
| 5,706,155 A * | 1/1998 | Neiger et al. ................. 361/45 |
| 6,040,967 A * | 3/2000 | DiSalvo ........................ 361/42 |
| 6,522,510 B1 * | 2/2003 | Finlay et al. .................. 361/42 |
| 6,628,486 B1 * | 9/2003 | Macbeth ........................ 361/42 |
| 6,795,285 B1 * | 9/2004 | Jozwiak et al. ............... 361/45 |

* cited by examiner

*Primary Examiner*—Michael Sherry
*Assistant Examiner*—Boris Benenson
(74) *Attorney, Agent, or Firm*—Daniel P. Malley; Bond, Schoeneck & King PLLC

(57) ABSTRACT

The present invention is directed to a protective wiring device that includes a plurality of line terminals coupled to a plurality of load terminals by way of at least one conductive path. A miswire detection circuit is coupled to the at least one conductive path. The miswire detection circuit is configured to monitor signal propagation characteristics on the at least one conductive path and generate a miswire detection signal based on the signal propagation characteristics commencing each time source power is applied to either the plurality of line terminals or the plurality of load terminals. A fault detection circuit is coupled to the at least one conductive path. The fault detection circuit is configured to detect a fault condition propagating on the at least one conductive path. The fault detection circuit is configured to generate a trip signal in response to either the fault condition or the miswire detection signal. A circuit interrupter is coupled to the fault detection circuit. The circuit interrupter is configured to introduce an electrical discontinuity in the at least one conductive path in response to the trip signal.

39 Claims, 8 Drawing Sheets

WIRING DEVICE WITH MULTI-SHOT MISWIRE

CROSS-REFERENCE TO RELATED APPLICATIONS

This is a continuation-in-part of U.S. patent application Ser. No. 10/884,304 filed on Jul. 2, 2004 now U.S. Pat. No. 7,133,266, U.S. patent application Ser. No. 11/103,722 filed on Apr. 12, 2005 now U.S. Pat. No. 7,212,386, and U.S. patent application Ser. No. 10/900,769 filed on Jul. 28, 2004 now U.S. Pat. No. 7,154,718, the contents of which are relied upon and incorporated herein by reference in their entirety, and the benefit of priority under 35 U.S.C. § 120 is hereby claimed.

BACKGROUND OF THE INVENTION

1. Field of the Invention

The present invention relates generally to electrical wiring devices, and particularly to protective wiring devices.

2. Technical Background

AC power is provided to a house, building or other such facilities by coupling one or more breaker panels to an electrical distribution system, or another such source of AC power. The breaker panel distributes AC power to one or more branch electric circuits installed in the structure. The electric circuits typically include one or more receptacle outlets and may further transmit AC power to one or more electrically powered devices, commonly referred to in the art as load circuits. The receptacle outlets provide power to user-accessible loads that include a power cord and plug, with the plug being insertable into the receptacle outlet. Because certain types of faults have been known to occur in electrical wiring systems, each electric circuit typically employs one or more electric circuit protection devices. Electric circuit protective devices have been disposed within the breaker panel, receptacle outlets, plugs and the like.

Both receptacle wiring devices and electric circuit protective wiring devices in general, are disposed in an electrically non-conductive housing. The housing includes electrical terminals that are electrically insulated from each other. The line terminals are intended to be connected by the installer to a power source of an electrical distribution system, and the feed-through load terminals are intended to be connected to provide the electrical power to downstream receptacles, lighting fixtures, switches, and the like. Receptacle load terminals are electrically connected to the feed-through load terminals. The receptacle load terminals are configured to align with the blades of an attachment plug in order to provide source power by way of the plug to a user attachable load. Protective devices typically include a circuit interrupter that connects the line terminals to the load terminals in the reset state and disconnects the line terminals from the feed-through and receptacle load terminals in the tripped state. The circuit interrupter trips when a fault condition occurs. There are various types of protective devices including ground fault circuit interrupters (GFCIs), ground-fault equipment protectors (GFEPs), and arc fault circuit interrupters (AFCIs). Some protective devices include both GFCIs and AFCIs.

An arc fault typically manifests itself as a high frequency current signal. Accordingly, an AFCI may be configured to detect various high frequency signals and de-energize the electrical circuit in response thereto. A ground fault occurs when a current carrying (hot) conductor creates an unintended current path to ground. A differential current is created between the hot/neutral conductors because some of the current flowing in the circuit is diverted into the unintended current path. The unintended current path represents an electrical shock hazard. Ground faults, as well as arc faults, may also result in fire.

A "grounded neutral" is another type of ground fault. This type of fault may occur when the load neutral terminal, or a conductor connected to the load neutral terminal, becomes grounded. While this condition does not represent an immediate shock hazard, it may lead to serious hazard. As noted above, a GFCI will trip under normal conditions when the differential current is greater than or equal to approximately 6 mA. However, when the load neutral conductor is grounded the GFCI becomes de-sensitized because some of the return path current is diverted to ground. When this happens, it may take up to 30 mA of differential current before the GFCI trips. Therefore, if a double-fault condition occurs, i.e., if the user comes into contact with a hot conductor (the first fault) when simultaneously contacting a neutral conductor that has been grounded on the load side (the second fault), the user may experience serious injury or death.

Another type of fault condition is commonly referred to as miswiring, or reverse wiring. A protective device may be miswired during installation by connecting the load terminals to AC power. When this happens, the circuit interrupter may be unable to interrupt the flow of electrical current to the receptacle terminals when a fault condition is present. Unfortunately, protective devices do not typically alert the user to the miswire condition. Thus, it is not until damage or injury occur that the miswired condition is evident. As noted above, receptacle load terminals and the feed-through load terminals may be permanently connected by an electrical conductor. When a device is properly wired, the circuit interrupter typically includes a single breaker that breaks the connection between the line terminals and both the feed-through load terminals and the receptacle load terminals. In other words, the typical protective device is not configured to remove power from the user load when a hazardous fault condition is extant. Accordingly, when a receptacle type device is reverse wired, unprotected AC power may be available at the receptacle load terminals when the circuit interrupter is in the tripped state.

Protective devices may be equipped with a test button. However, while test buttons may be determine the ability of the protective device to detect and interrupt a fault condition, they are typically not configured to reveal a reverse-wired condition. Accordingly, many devices are provided with wiring instruction sheets. Unfortunately, instruction sheets are often ignored by installers.

In one approach that has been considered, a protective device is equipped with a barrier(s) that is/are configured to prevent circuit reset until AC voltage is present at the line terminals. The barrier may alert the installer to the reverse-wired condition by preventing reset of the device and by denying AC power to the feed-through load. This approach may be effective during the original installation of the protective device. However, once proper installation is effected the barrier is deactivated and inoperative during a subsequent re-installation. This drawback is further exacerbated by the fact that the installation instructions are unlikely to be available for any re-installation.

In another approach that has been considered, a protective device may be equipped with a fuse that is configured to prevent circuit interrupter reset until AC voltage is provided to the line terminals. The fuse circuit prevents reset of the device and denies power to the feed-through load until proper wiring is effected. Once proper wiring is effected, the fuse blows and is no longer available to detect a reverse-wired condition if there is a reinstallation. Again, making matters worse, the installation instructions are likely to be lost and not available for any re-installation.

In another approach that has been considered, a protective device may be equipped with one or more sets of isolating contacts disposed between the feed-through load terminals and the receptacle load terminals. In this approach, the set of isolating contacts may be controlled by a miswire detection circuit. In the event of a miswire condition, the miswire detection circuit is configured to either open (or prevent closure) of the isolating contacts. After a proper wiring condition is detected, the miswire detection circuit is configured to either close (or permit closure) of the isolating contacts. Like the other approaches considered above, the miswire detection circuit is ineffectual after an initial proper installation, and is no longer available to detect a reverse-wired condition during any reinstallation. Thus, the isolating contacts are closed in spite of a reverse wired condition.

What is needed is a protective device that denies power to the protected circuit, including receptacle terminals, during a miswired condition. Further, a protective device, responsive to the miswired condition during each and every installation, is needed.

SUMMARY OF THE INVENTION

The present invention addresses the needs described above. In particular, the present invention is directed to a protective device that denies power to the protected circuit, including receptacle terminals, during a miswired condition. More importantly, the protective device of the present invention is responsive to the miswired condition during each and every installation.

One aspect of the present invention is a protective wiring device that includes a plurality of line terminals coupled to a plurality of load terminals by way of at least one conductive path. A miswire detection circuit is coupled to the at least one conductive path. The miswire detection circuit is configured to monitor signal propagation characteristics on the at least one conductive path and generate a miswire detection signal based on the signal propagation characteristics commencing each time source power is applied to either the plurality of line terminals or the plurality of load terminals. A fault detection circuit is coupled to the at least one conductive path. The fault detection circuit is configured to detect a fault condition propagating on the at least one conductive path. The fault detection circuit is configured to generate a trip signal in response to either the fault condition or the miswire detection signal. A circuit interrupter is coupled to the fault detection circuit. The circuit interrupter is configured to introduce an electrical discontinuity in the at least one conductive path in response to the trip signal.

In another aspect, the present invention is directed to a method for wiring a protective device in an electrical circuit. The protective device includes a plurality of line terminals coupled to a plurality of load terminals by way of at least one conductive path. The method includes connecting the plurality of load terminals to source voltage. Signal propagation characteristics on the at least one conductive path are monitored, monitoring commencing each time source voltage is applied to the plurality of load terminals. A miswire trip signal is generated based on a predetermined signal propagation characteristic. An electrical discontinuity is introduced in the at least one conductive path in response to the trip signal.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION

Figure 1:
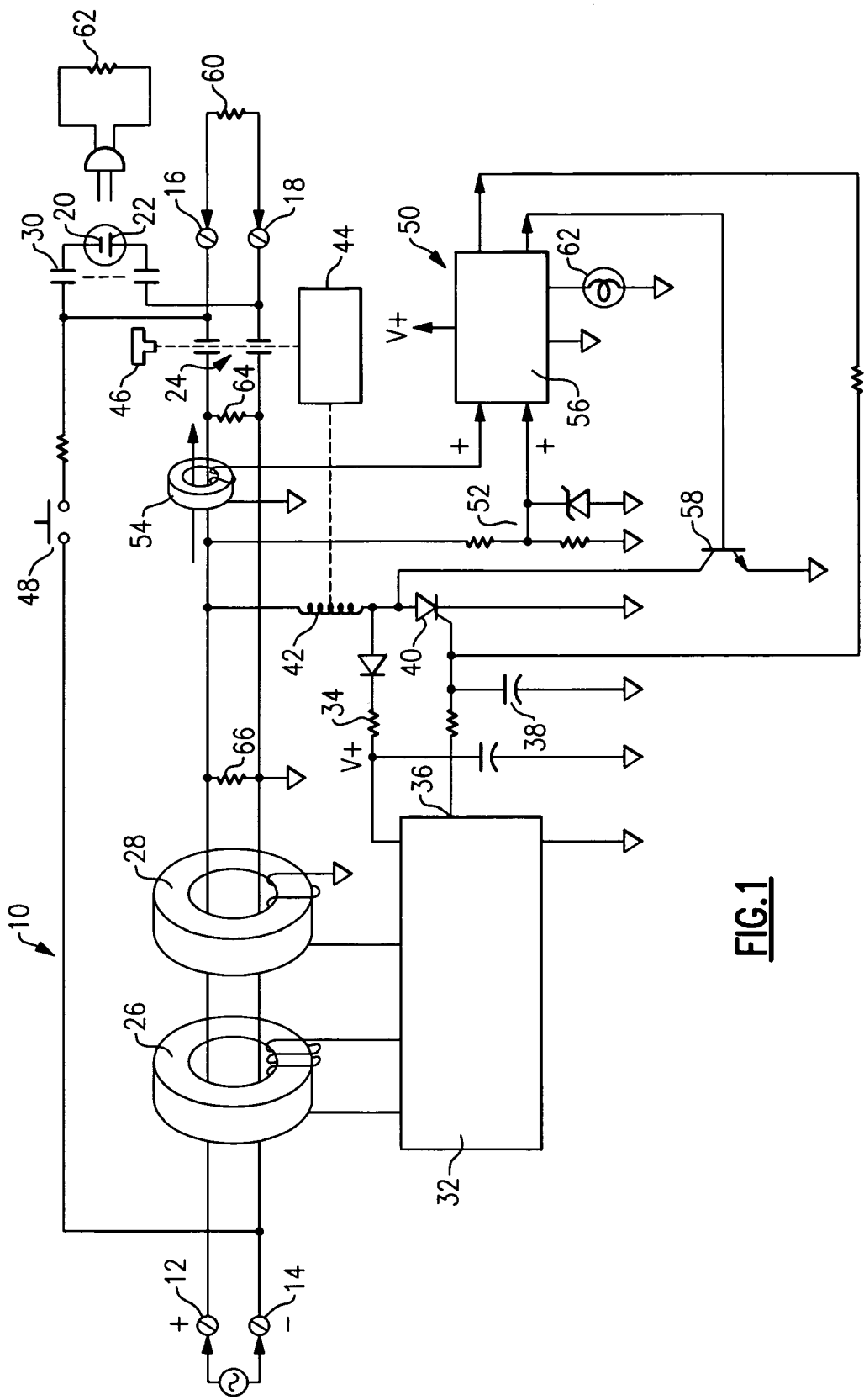
FIG. 1 is a schematic diagram of a protective device in accordance with a first embodiment of the present invention.

Reference will now be made in detail to the present exemplary embodiments of the invention, examples of which are illustrated in the accompanying drawings. Wherever possible, the same reference numbers will be used throughout the drawings to refer to the same or like parts. An exemplary embodiment of the protective device of the present invention is shown in FIG. 1, and is designated generally throughout by reference numeral 10.

As described in more detail below, protective device 10 includes a plurality of line terminals coupled to a plurality of load terminals by way of at least one conductive path. When the plurality of load terminals are connected to source voltage, device 10 monitors signal propagation characteristics on the at least one conductive path. Device 10 is configured such that the step of monitoring commences each time source voltage is applied to the plurality of load terminals. A miswire trip signal is generated based on a predetermined signal propagation characteristic. An electrical discontinuity is introduced in the at least one conductive path in response to the trip signal.

Figure 2:
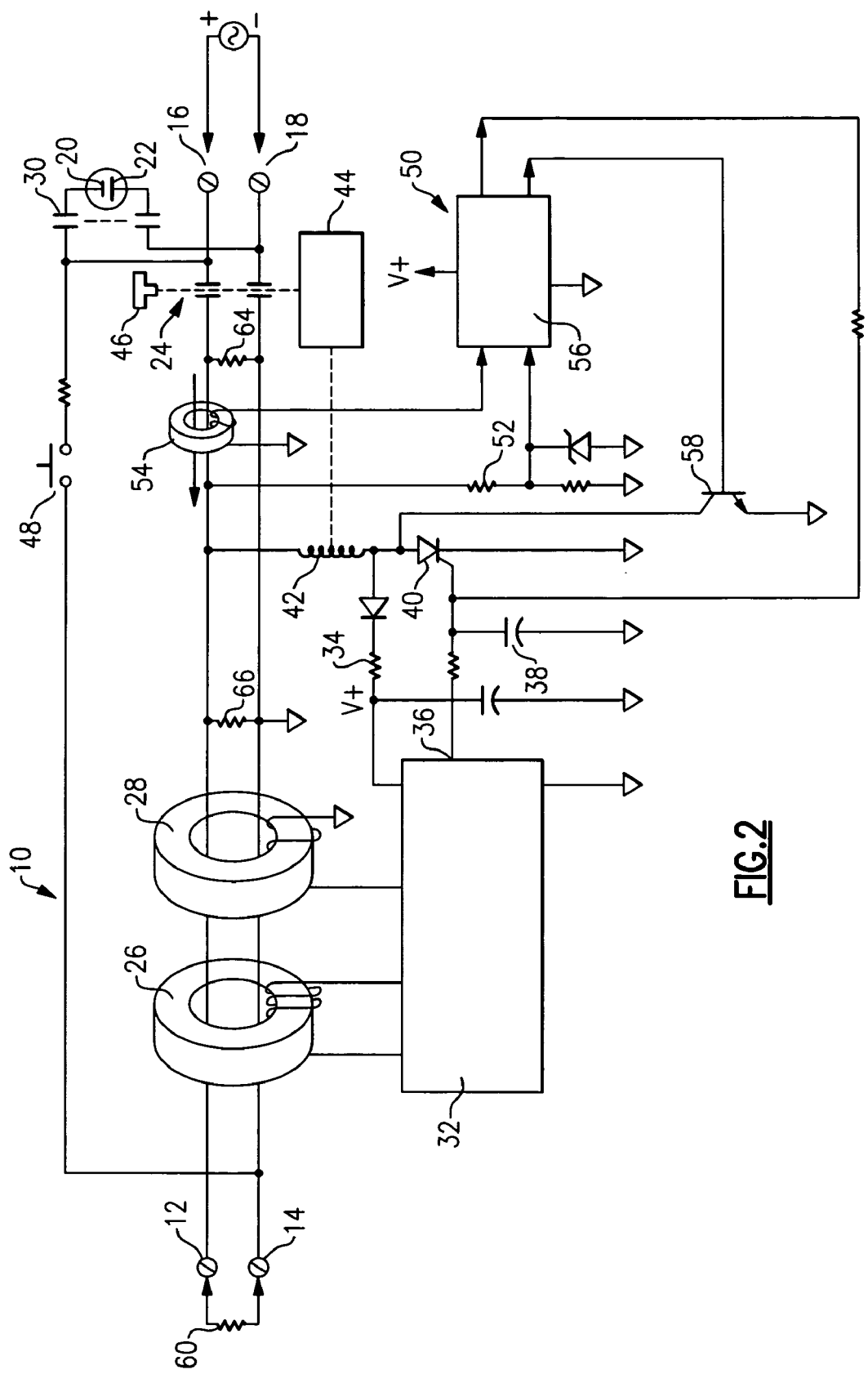
FIG. 2 is a schematic of the protective device shown in FIG. 1 in a miswired state.

Referring to FIG. 1 and FIG. 2, a schematic diagram of a protective device 10 in accordance with a first embodiment of the present invention is disclosed. FIG. 2 is a schematic diagram of the protective device in a miswired state.

Device 10 typically includes a hot line terminal 12 and a neutral line terminal 14. Line terminals 12, 14 are coupled to sensor 26 and sensor 28 by way of a hot conductive path and a neutral conductive path, respectively. The conductive paths are connected to circuit interrupter 24. Circuit interrupter 24 couples the line terminals (12, 14) to the feed-through terminals (16, 18) and the receptacle terminals (20, 22) when circuit interrupter 24 is in a reset state. Those of ordinary skill in the art will understand that load terminals 16, 18, may be connected to wires coupled to one or more downstream receptacles, or switches, in a daisy chain arrangement. Receptacle terminals 20, 22 are configured to mate with an appliance plug connected by a power cord to an electrical appliance or a similar electrical load. Of course, circuit interrupter 24 disconnects the line terminals from both the load terminals 16, 18 and the receptacle load terminals 20, 22 in the tripped state.

In one embodiment of the present invention, isolating contacts 30 are configured to disconnect one or more of the feed-through terminals 16, 18 from a corresponding receptacle terminal 20, 22. Such contacts are open when the device has been miswired. Isolating contacts 30 are coupled operably to circuit interrupter 24 such that they are open when circuit interrupter 24 is in the tripped state. Alternatively, isolating contacts 30 are coupled operably to a supplementary interrupter (not shown) such that they are open when device 10 has been miswired.

Device 10 operates as follows. Sensor 26 is a differential transformer which is configured to sense load-side ground faults. Sensor 28 is a grounded neutral transformer and is configured to generate and couple a fault signal to the differential transformer in the event of a grounded-neutral fault condition. Differential transformer 26 and grounded-neutral transformer 28 are coupled to detector circuit 32. Power supply circuit 34 conditions AC power by providing a DC (V+) voltage supply for GFCI detector circuit 32. Detector 32 provides a fault detect output signal 36 in response to sensor inputs from transformers (26, 28.) Output signal 36 is directed into filter circuit 38. The filtered output signal is provided to the control input of SCR 40. SCR 40 is turned ON to energize solenoid 42 when it is turned ON by the filtered output signal. Solenoid 42 drives trip mechanism 44 to open the interrupting contacts in circuit interrupter 24.

The trip solenoid 42 remains energized until the contacts in circuit interrupter 24 are tripped. The open contacts interrupt the flow of fault current. The sensor output signal generated by transformer 26 is also terminated by the interruption of the fault current. When the transformer signal ceases, the detector output signal changes state turning SCR 40 OFF. Once SCR 40 is OFF, solenoid 42 de-energizes within a time period that is less than about 25 milliseconds. After the fault condition has been eliminated, reset button 46 may be employed to reset circuit interrupter 24.

Device 10 also is equipped with a test facility. In particular, when test button 48 is depressed by a user, a simulated fault condition is generated. The simulated fault condition is used to check the operative condition of GFCI 10. Circuit interrupter 24 will trip if the device is properly operating. Power may be restored to device 10 after a successful test by pressing reset button 46. In an alternative embodiment of the present invention, the test facility can be actuated by depressing the reset button 46. Switch contacts in communication with reset button 46 close the test circuit to initiate the test in the manner previously described.

Device 10 includes a miswire lock-out circuit 50. Miswire lock-out circuit 50 includes a voltage sensor 52 that monitors the polarity of the AC (or DC) source voltage. Current transformer 54 monitors the direction of the current (i.e., current polarity) from the voltage source to load 60. When device 10 is properly wired as shown in FIG. 1, the current transformer also monitors the current through a user attachable load 62. If the polarity of the current and the polarity of the voltage match each other, processor 56 determines that device 10 has been properly wired.

Referring to FIG. 2, if the current and voltage polarities oppose each other, processor 56 determines that device 10 has been reverse wired. In response to a reverse wired condition, processor 56 sends a signal to SCR 40 to turn ON, causing circuit interrupter 24 to trip. If the reset button 46 is operated, circuit interrupter 24 momentarily resets, but trips soon thereafter when the miswired condition is again detected by processor 56. The circuit interrupter will continue to trip until the reverse wiring condition is corrected. It is noted that device tripping is automatic, i.e., the installer does not have to manually operate the test facility or manually perform some other action to initiate lock-out. However, sensing current has been described as a prerequisite for determining proper or reverse wiring. Therefore the device will fail to lock-out, even if a miswired condition is present, until such time as a load (60, 62) is connected to the device to generate the current. It is desirable for device 10 to lock-out in response to a miswired condition without having to wait until an external load is connected.

In an alternate embodiment, device 10 may include an internal load 64 disposed between current transformer 54 and circuit interrupter 24. Internal load 64 operates in a similar manner to external load 60 by generating a current flow having a polarity indicative of proper wiring. Unlike load 60, load 64 does not generate a current flow through transformer 54 when device 10 is reverse wired. Thus, when device 10 includes an internal load, lock-out circuit 50 is configured to permit device 10 to reset when the current polarity and the voltage polarity match each other. On the other hand, lock-out circuit 50 is configured to trip device 10 when the current polarity and the voltage polarity oppose each other or when no load current is being sensed by transformer 54 (i.e., before device is connected to an external miswired load 60).

Alternatively, an internal load 66 may be disposed between current transformer 54 and the line terminals 12,14. Load 66 operates in a similar manner to load 60 by generating a current flow through transformer 54 indicative of reverse wiring. Unlike load 60, load 66 does not generate a current flow through transformer 54 when device 10 is properly wired. In this embodiment, lock-out circuit 50 is configured to trip device 10 when the current polarity through load 66 (with or without load 60) compared to the voltage polarity oppose each other. On the other hand, lock-out circuit 50 is configured to permit device 10 to reset when the current polarity and voltage polarity match each other, or when there is no load current present. In yet another embodiment of the present invention, loads 64 and 66 are both be included. This also avoids the need for an external load in order to determine whether the protective device has been properly wired.

Referring back to FIG. 1, a transistor 58 may be disposed between SCR 40 and processor 56. Processor 56 pulses transistor 580N at a predetermined repetition rate to initiate a current through solenoid 42. However, while each pulse generates a current through solenoid 42, the resulting energy in the solenoid is not enough to actuate trip mechanism 44.

Solenoid 42 functions as a pulsed load. Processor 50 is configured to determine whether or not device 10 is properly wired on the basis of the direction (polarity) of the pulsed current through solenoid 42 with respect to the voltage polarity. Processor may make a miswire determination on the basis of one or more pulses.

In another embodiment, solenoid 42 may be connected between current transformer 54 and circuit interrupter 24. Alternatively, solenoid 42 may be connected between feed-through load terminals 16, 18 or receptacle load terminals 20, 22. In either case, transistor 58 pulses solenoid 42 in the manner previously described. Solenoid 42 again functions as a pulsed load.

In yet another embodiment, transistor 58 is configured to pulse resistors 64 or 66 into conduction (not shown.) In general, the benefit of pulsing the current through an internal load (64, 66, 42) is that a thermal dissipation rating of a load may be reduced by more than ten-fold. Accordingly, the load may be miniaturized.

In the embodiment shown in FIG. 1, an indicator 62 is coupled to processor 56. Indicator 62 includes visible and/or audible indication of a miswired condition. Processor 56 may provide a repetitive signal to indicator 62, in which case indicator 62 provides a blinking and/or beeping indication of a miswired condition.

While FIG. 1 and FIG. 2 are directed to ground fault detection circuitry, the present invention is equally applicable to other types of protective devices. Those of ordinary skill in the art will recognize that substantially all of the various types of protective devices include similar components for sensing, detecting and interrupting the circuit interrupting contacts in response to a particular fault condition. For example, the sensor in an arc fault circuit interrupter (AFCI) is similar to transformer 26 but is typically configured to sense load current instead of differential current and/or line voltage. An AFCI sensor may include at least one of a toroidal transformer, shunt or voltage divider. Further, the detector in the AFCI may be implemented as an integrated circuit similar in form factor to the detector 32. The AFCI detector may also be configured to detect an arc fault condition on the basis of the frequency spectrum of the load current. Those of ordinary skill in the art will recognize that an arc fault may exhibit high frequency noise burst patterns. Once an arc fault condition has been detected, a signal is sent to SCR 40 to trip the device.

Figure 3:
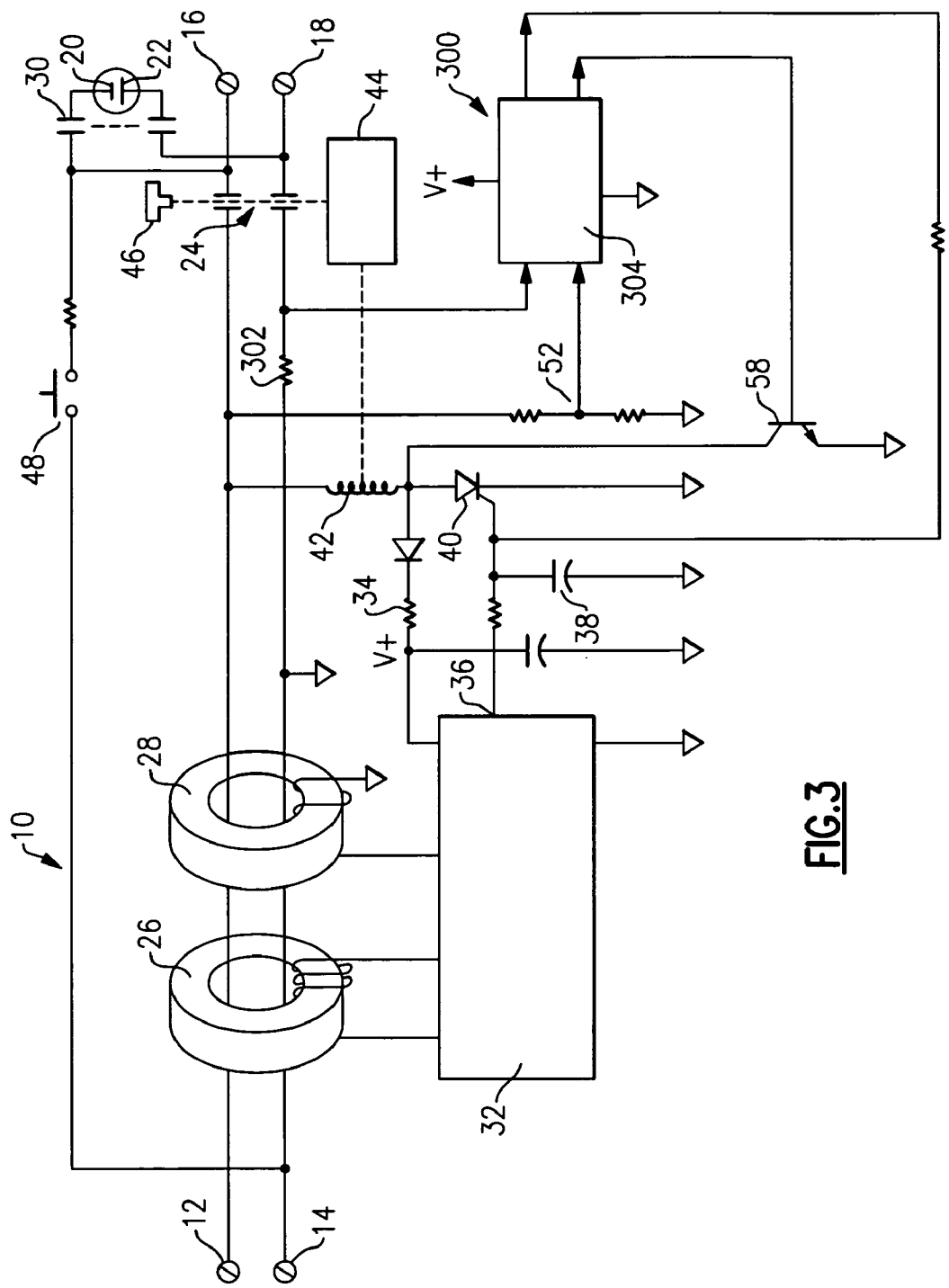
FIG. 3 is a schematic diagram in accordance with a second embodiment of the present invention.

Referring to FIG. 3, a schematic diagram in accordance with a second embodiment of the present invention is disclosed. Miswire lock-out circuit 300 is similar to lock-out circuit 50 shown in FIGS. 1 and 2. The embodiment shown in FIG. 3 includes a shunt sensor 302 coupled to processor 304. The function of sensor 302 is similar to transformer 54. Processor 304 is configured to determine the polarity of the load current using shunt sensor 302.

Figure 4:
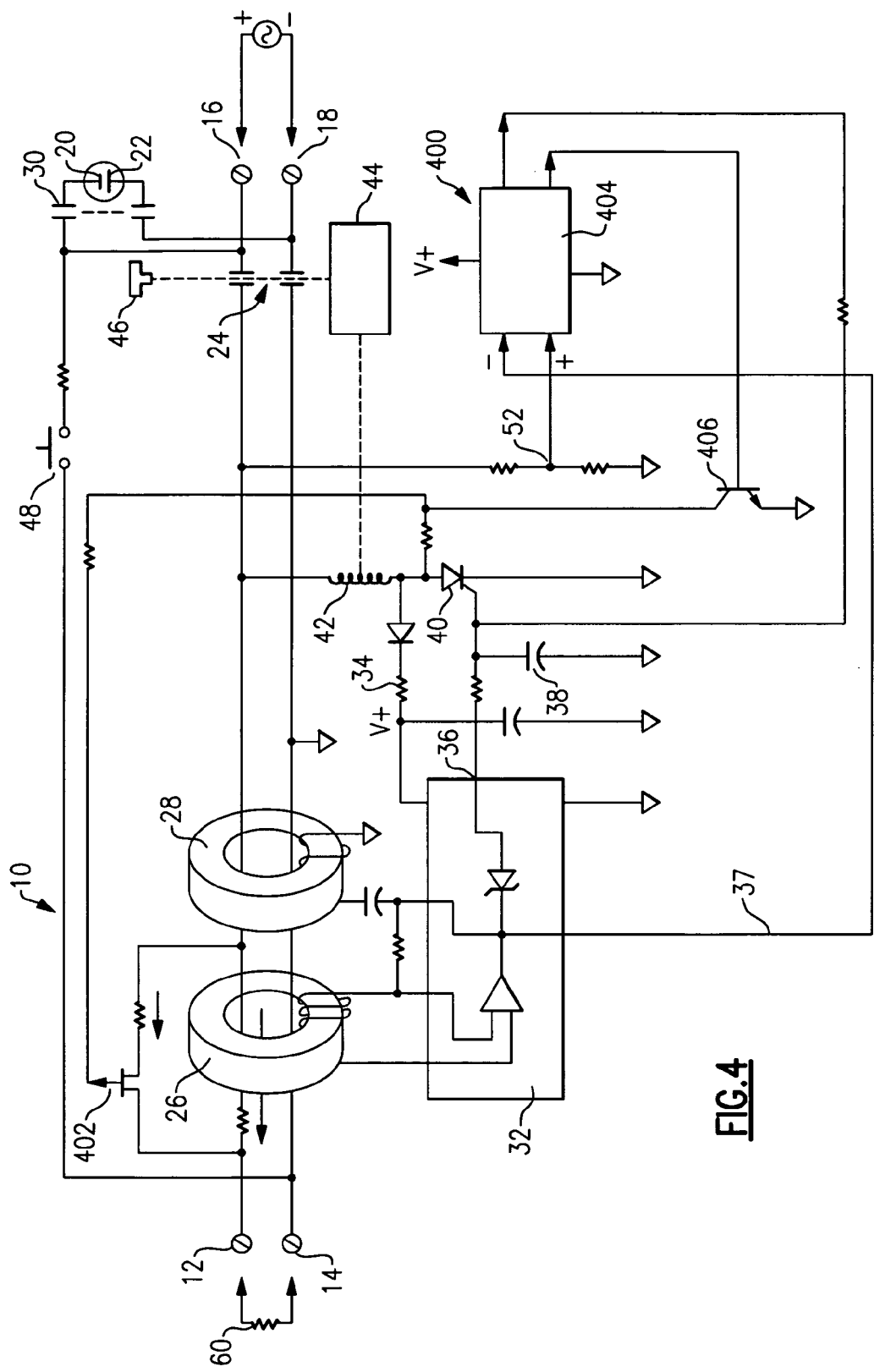
FIG. 4 is a schematic diagram in accordance with a third embodiment of the present invention.

As embodied herein and depicted in FIG. 4, a schematic diagram in accordance with a third embodiment of the present invention is disclosed. This embodiment does not include a separate load current polarity sensor per se. Instead, the protective device itself is configured to determine the polarity of the load current. In particular, miswire lock-out circuit 400 includes a switching device 402 coupled to processor 400 by way of transistor 406. Switching device 402 is open or closed in response to a signal from processor 404. In particular, switching device 402 is opened or closed in response to a signal from processor 404 by way of transistor 406. When switching device 402 is open, currents through line hot conductor 12 and line neutral conductor 14 flow equally and oppositely through differential transformer 26. Accordingly, the differential signal generated by transformer 26 is not indicative of a fault (or simulated fault) condition. However, when switching device 402 is closed, a portion of the load current flowing through one or the other conductor is diverted through the switching device. Since the currents in the two conductors are no longer equal, a fault signal is provided to detector 32. Detector 32 provides an output load current signal to processor 404 on detector output line 37. Processor 404 uses the output load current signal to determine the load current polarity.

It is also noted that transistor 406 may perform a function similar to that performed by transistor 58 in the embodiment depicted in FIG. 1. Transistor 58 provided a pulsed signal to solenoid 42. In response, solenoid 42 was momentarily driven into conduction to provide a pulsed load current. Thus, the embodiment in FIG. 4 provides several means for detecting miswire, or reverse wiring, conditions.

Device 10 is shown in FIG. 4 as being reverse wired. When the AC (or DC) source voltage is positive during the time that switching device 402 is closed, the direction of the summed current through differential transformer 26 results in detector 32 providing a negative current polarity signal to processor 404. Since the voltage and current polarities oppose each other, processor 404 provides a signal to SCR 40 to trip circuit interrupter 24. Switching device 402 may be closed by processor 400 only during the negative half cycle intervals of the AC source voltage cycle. This avoids the possibility of detector output signal 36 causing false tripping since SCR 40 cannot turn ON during negative half cycles.

FIGS. 5A-5E are timing diagrams illustrating the miswire protection functionality of the present invention. The waveforms are described using the references in FIG. 1 but are applicable to other embodiments of the invention as well. The waveforms pertain to a protective device 10 that is reverse-wired and in the reset state, i.e., AC source voltage is connected to the device feed-through terminals 16, 18.

FIG. 5A is a diagrammatic representation of the load current 502. AC source voltage is applied to device 10 at time 500. Referring to FIG. 5B, processor 56 generates a predetermined time delay interval 501 also commencing at time 500. The miswire lock-out circuit is prevented from tripping even if there is a miswire condition, until delay interval 501 elapses. Time interval 501 is pre-programmed into processor 56 based on known transient noise properties. Transient noise 505 may be generated by the initial application of AC power to a device, or by the application of AC power after a power outage. Accordingly, time interval 501 is programmed into processor 56 to prevent transients 501 from initiating a false lockout of device 10. Those of ordinary skill in the art will understand that interval 501 is less than about 1 second.

FIG. 5C is a diagrammatic representation of the source voltage 503. Note that AC source voltage 503 is out of phase with load current 502, shown in FIG. 5A. As noted previously, the out of phase condition represents the fact that the protective device has been reverse wired. Note also that AC source voltage 503 and load current 502 are out of phase by a phase shift amount 506. Phase shift 506 represents the possibility of an inductive load shift that loads 64, 66, or 42, if provided, are unable to compensate for.

Figure 5:
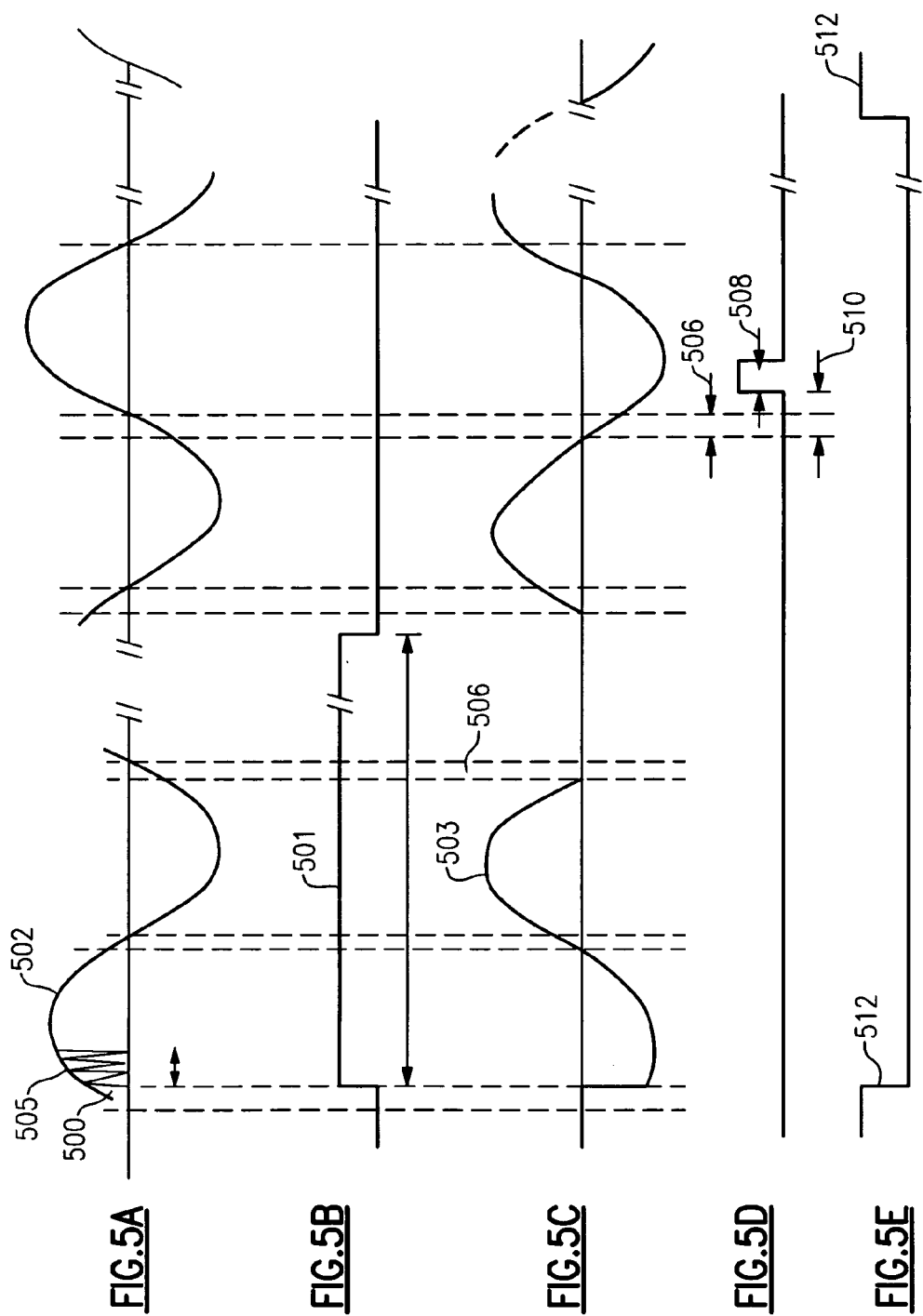
FIGS. 5A-5E are timing diagrams illustrating the miswire protection functionality of the present invention.

As shown in FIG. 5D, processor 56 pulses a load into conduction during an interval 508. As described above, the pulsing is performed to compare the polarities of the load current and source voltage. In the example provided by FIG. 5, the two signals are of opposite polarity. Thus, processor 56 determines that device 10 has been miswired. Processor 56 may be programmed such that interval(s) 508 occur only during the negative half cycles of the source voltage for the reasons provided above.

Note also that interval(s) 508 must not be allowed to coincide with intervals 506. Despite the fact that device 10 is miswired, the load current and source voltage polarities match in these intervals because of the phase shift 506. Processor 56 is programmed to delay the commencement of interval 508 by a time period 510 from the current zero crossing to avoid an erroneous wiring state indication by processor 56.

Window interval 512 shown in FIG. 5E prevents the miswire detection circuit from causing false tripping. Window 512 is initiated at time 500 and elapses after a predetermined period of time has transpired. Thus, the proper wiring/miswiring decision-making process only occurs within window 512. Once the miswire lock-out circuit 50 completes its task, it is prevented from causing false tripping after interval 512 has elapsed.

Figure 6:
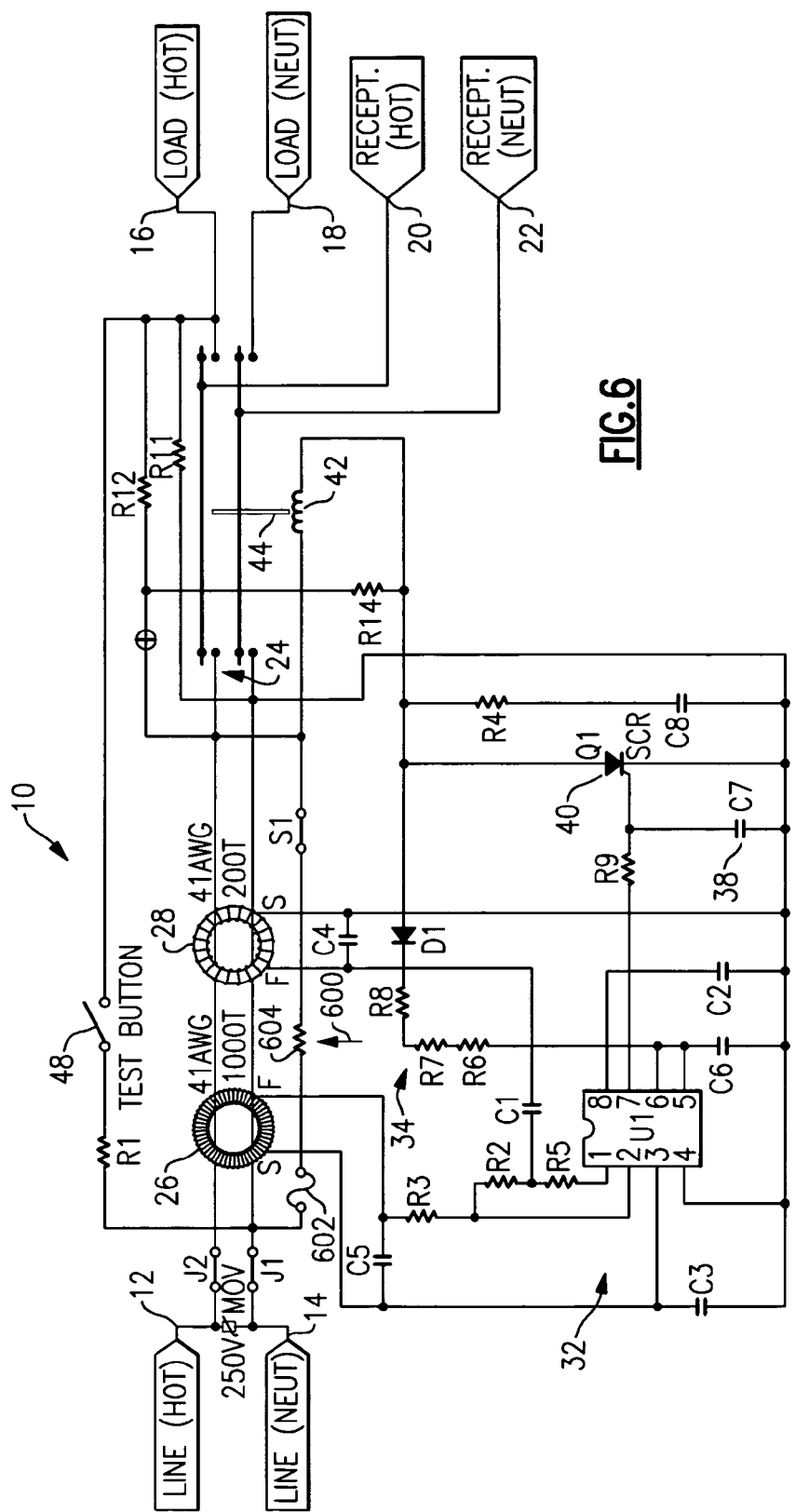
FIG. 6 is a schematic of a miswire lockout circuit in accordance with a fourth embodiment of the present invention.

As embodied herein and depicted in FIG. 6, a schematic of a miswire lockout circuit in accordance with a fourth embodiment of the present invention is disclosed. Reference is made to U.S. patent application Ser. No. 10/884,304, which is incorporated herein by reference as though fully set forth in its entirety, for a more detailed explanation of a miswire circuit including a fuse. Miswire lock-out circuit 600 is connected to the line side of circuit interrupter 24. When protective device 10 is installed, fuse 602 is closed. If the device is properly wired during the installation and the source voltage is turned on, current through the circuit 600 generates a simulated fault current to trip the circuit interrupter 24. Current continues to flow through circuit 600 until a thermal element 604 disposed in circuit 600 opens fuse 602, thus breaking electrical connectivity in the circuit. Once electrical connectivity is broken, the simulated fault current ceases, permitting device 10 to be reset.

Assuming the device is reset, if the device is miswired during the installation and the source voltage is turned on current flows through circuit 600 by way of circuit interrupter 24. The simulated fault current causes the circuit interrupter 24 to trip. In turn, the fault current stops flowing by the tripping action. Note that the circuit interrupter trips in response to the simulated fault current typically in less than 25 milliseconds. The heat generated in thermal element 604 during this time frame is insufficient to open fuse 602. Accordingly, fuse 602 is operational until the device is wired properly. Device 10 will continue to trip after each reset until the device is wired properly.

In an alternate embodiment, fuse 602 is configured to self-heat in response to the current flow, eliminating the need for thermal element 604. Other miswire circuits are similar in performance to circuit 600 but are re-configured to produce a signal or simulated fault signal as appropriate for ground fault circuit interrupters, arc fault circuit interrupters, combination arc fault and ground fault circuit interrupters or other types of protective devices (not shown.)

Fuse 602 may also be implemented using a resettable, or reclosable, fuse. After device 10 is removed from an installation, fuse 602 is closed to thereby restore miswire circuit 600. At this point, the protective device is configured to enter a lock-out state in the event of being miswired during re-installation.

Figure 7:
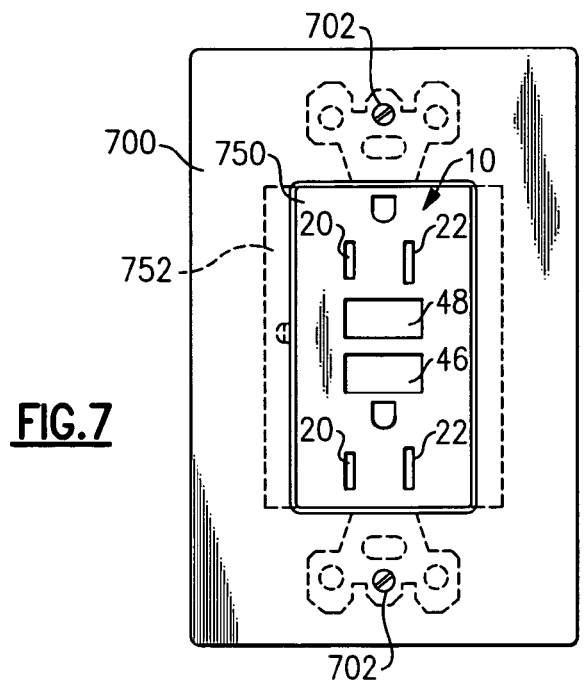
FIG. 7 is a front cover view of a protective device in accordance with the present invention.

FIGS. 7-11 illustrate a typical installation of the present invention. Referring to FIG. 7, a front cover view of a protective device in accordance with the present invention is disclosed. Device 10 includes a front housing 750 that includes a flange 752. The protective device is configured to be covered by a wall plate 700 that is secured to device 10 by way of fasteners 702. Alternatively, device 10 can be covered by a panel that is fastened to device 10 by way of fasteners 702. Fasteners 702 cause wall plate 700 (or the panel) to be pressed against flange 752.

Figure 8:
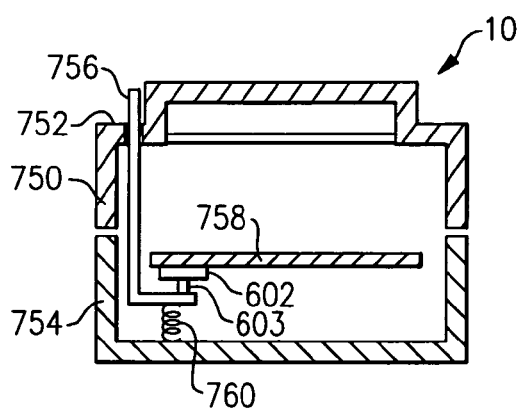
FIGS. 8-9 are cross-sectional views of the protective device in accordance with an embodiment of the present invention.

FIG. 8 is a cross-sectional view of the protective device shown in FIG. 7. Device 10 includes a housing 754 that is configured to mate with the front housing 750. A printed circuit board (PCB) 758 is disposed within device 10. Resettable fuse 602 is coupled to PCB 758. Resettable fuse 602 is reset by applying a momentary force to arm 603. Note that wall plate 700, or the panel, is not shown as being installed in FIG. 8. Thus, probe 756 to free to extend into the unoccupied region above flange 752 due to a biasing force of spring 760. The biasing force of spring 760 also forces arm 603 against fuse 602, urging the fuse to re-close. Accordingly, once the wall plate is removed, the fuse miswire circuit 600 is re-established.

Figure 9:
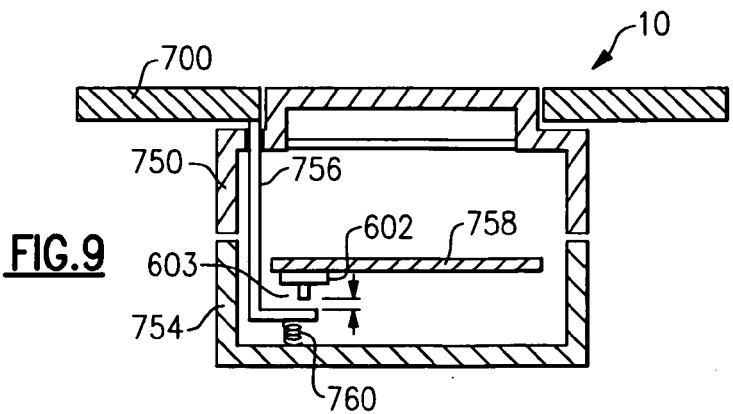

FIG. 9 shows device 10 after re-installation. Wall plate 700 (or the panel) is pressed against flange 752 by way of fasteners 702 directing probe 756 in a downward direction. Probe 756 compresses spring 760 so that force is no longer being applied by arm 603. As such, fuse 602 stays in the closed position until such time as device 10 has been properly wired. As a side benefit, if device 10 is installed, but the wall plate 700 has not been installed, fuse 602 is permanently closed. Thus circuit 600 prevents device 10 from resetting whether device 10 is properly wired or miswired. The rationale behind this safety feature is that without the wall plate, the load terminals are physically accessible to the user. Accordingly, the safety feature prevents the user from being exposed to any voltage present on the load terminals.

It will be apparent to those of ordinary skill in the pertinent art that modifications and variations can be made to resettable fuse 602 of the present invention depending on the form factor of PCB 758 and the disposition of arm 603. By way of example, resettable fuse 602 may be implemented using Model X 2296 manufactured by Thermo-Disc. Of course, those of ordinary skill in the art will recognize that any suitable resettable fuse device may be employed in the present invention.

Figure 10:
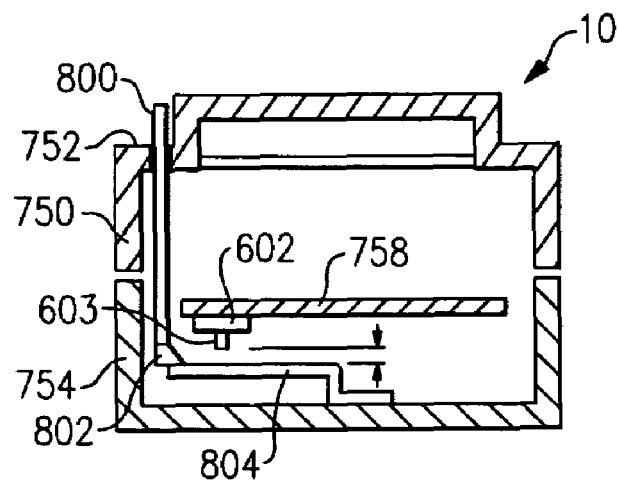
FIGS. 10-11 are cross-sectional views of the protective device in accordance with an alternate embodiment of the present invention.
Figure 11:
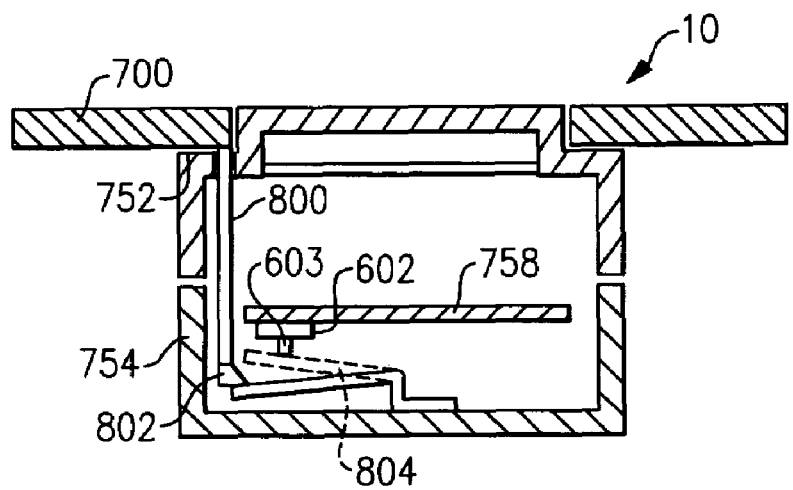

FIGS. 10-11 are cross-sectional views of the protective device in accordance with an alternate embodiment of the present invention. Probe 800 is similar to probe 756 except that it includes striker 802. Striker 802 is configured to deflect cantilever beam 804 when wall plate 700 is installed. Once cantilever 804 is deflected by a predetermined amount, it clears striker 802 and rebounds to momentarily apply a force to arm 603 to re-close the fuse. Accordingly, miswire circuit 600 may be reactivated only by installation of the wall plate. In an alternate embodiment, a striker is configured so that the momentary force to arm 603 occurs when wall plate 700 is removed. For this embodiment, reactivation of the miswire circuit 600 does not require the installation of a wall plate, only the removal of a wall plate.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A protective wiring device comprising:
   a plurality of line terminals coupled to a plurality of load terminals by way of at least one conductive path;

a miswire detection circuit coupled to the at least one conductive path, the miswire detection circuit being configured to monitor signal propagation characteristics on the at least one conductive path and generate a miswire detection signal based on the signal propagation characteristics commencing each time source power is applied to either the plurality of line terminals or the plurality of load terminals;

a fault detection circuit coupled to the at least one conductive path, the fault detection circuit being configured to detect a fault condition propagating on the at least one conductive path, the fault detection circuit being configured to generate a trip signal in response to either the fault condition or the miswire detection signal; and a circuit interrupter coupled to the fault detection circuit, the circuit interrupter being configured to introduce an electrical discontinuity in the at least one conductive path in response to the trip signal.

2. The device of claim 1, wherein the signal propagation characteristics include a line voltage polarity and a load current polarity.

3. The device of claim 2, wherein the miswire detection circuit includes a comparator circuit configured to compare the line voltage polarity and the load current polarity, the miswire detection circuit generating the miswire detection signal based on the comparison of line voltage polarity and the load current polarity.

4. The device of claim 1, wherein the miswire detection circuit further comprises:
    a current sensor coupled to the at least one conductive path, the current sensor being configured to monitor a load current polarity;
    a voltage sensor coupled to the at least one conductive path, the voltage sensor being configured to monitor a line voltage polarity; and
    a processor coupled to the current sensor and the voltage sensor, the processor being configured to generate the miswire detection signal based on a comparison of the line voltage polarity and the load current polarity.

5. The device of claim 4, wherein the current sensor includes a shunt and/or current transformer.

6. The device of claim 4, wherein an electric load is coupled to the plurality of line terminals, and wherein the processor is configured to generate the miswire detection signal when the line voltage polarity and the load current polarity are opposite to each other during a predetermined time interval.

7. The device of claim 4, further comprising an internal electric load disposed between the current sensor and the circuit interrupter, whereby the processor is configured to generate the miswire detection signal when the current flowing through the internal electric load not being sensed by the current sensor.

8. The device of claim 7, wherein the processor is configured to generate the miswire detection signal when a load current polarity flowing through an external load connected to the line terminals and the line voltage polarity are opposite to each other.

9. The device of claim 4, further comprising an internal electric load disposed between the current sensor and the plurality of line terminals, whereby a miswire detection signal is not generated when the current flowing through the internal electric load is not sensed by the current sensor.

10. The device of claim 9, wherein the processor is configured to generate the miswire detection signal when a polarity of a current flowing through the internal load and the line voltage polarity oppose each other.

11. The device of claim 1, wherein the fault detection circuit further comprises:
    a sensor coupled to the at least one conductive path, the sensor being configured to sense differential current propagating on the at least one conductive path;
    a detector circuit coupled to the sensor, the detector being configured to detect a fault condition propagating on the at least one conductive path if the differential current exceeds a predetermined amount and generate the trip signal in response thereto;
    a switch element coupled to the detector and the processor, the switch element being configured to provide a switching current in response to the trip signal and the miswire detection signal; and
    a solenoid element coupled to the switch element, the solenoid being configured to actuate the circuit interrupter in response to the switching current.

12. The device of claim 6, further comprising an internal electric load, wherein the miswire detection circuit further comprises a processor circuit configured to direct a pulsed current into the internal electric load, the processor being configured to generate the miswire detection signal based on a polarity of the pulsed current flowing through the internal electric load compared to the line voltage polarity.

13. The device of claim 12, further comprising a transistor coupled between the internal electric load and the processor, the pulsed current being propagated by the transistor in response to the processor pulsing the transistor into an ON state at a predetermined repetition rate.

14. The device of claim 12, wherein the internal electric load includes a solenoid element.

15. The device of claim 12, wherein the internal electric load includes a resistance.

16. The device of claim 1, wherein the signal propagation characteristics include an electrical current.

17. The device of claim 16, wherein the miswire detection circuit includes a reclosable fuse.

18. The device of claim 17, wherein the reclosable fuse is configured to remain closed whenever the source voltage is connected to the plurality of load terminals, and wherein the reclosable fuse is configured to open whenever the source voltage is connected to the plurality of line terminals for a predetermined period of time.

19. The device of claim 17, wherein the reclosable fuse is configured to close each time that the device is removed from and/or installed in the electrical distribution system.

20. The device of claim 17, further comprising:
    a housing configured to accommodate the plurality of line terminals, the plurality of load terminals, and the circuit interrupter;
    a printed circuit board including the miswire detection circuit and the fault detection circuit at least partially disposed thereon, the reclosable fuse being mounted on the printed circuit board; and
    an actuator probe coupled to the reclosable fuse and partially accessible from an exterior portion of the housing, the actuator probe being configured to close the reclosable fuse.

21. The device of claim 20, wherein the actuator probe is prevented from closing the reclosable fuse when a wall plate is attached to the housing.

22. The device of claim 20, wherein the actuator probe maintains the reclosable fuse in a closed state if a wall plate is not attached to the housing, and wherein the circuit interrupter is prevented from resetting after the discontinuity is introduced.

23. The device of claim 17, wherein the reclosable fuse closes in response to a removal of a wall plate from the device.

24. The device of claim 17, wherein the miswire detection circuit includes a heating element that generates heat to open the reclosable fuse within a predetermined period of time.

25. The device of claim 1, wherein the miswire detection circuit includes
   a voltage sensor that generates a voltage signal in response to the source voltage;
   a current sensor that generates a current signal in response to the load current; and
   a processor that compares the voltage signal to the current signal to generate the trip signal based on a predetermined relationship between the voltage signal and the current signal.

26. The device of claim 25, wherein the predetermined relationship includes polarity comparison between the voltage signal and the current signal.

27. The device of claim 25, wherein the predetermined relationship includes a phase comparison between the voltage signal and the current signal.

28. The device of claim 25, wherein the device further includes a first internal load such that the current sensor generates a current signal in response to the first internal load current but only when the source voltage is connected to the plurality of line terminals.

29. The device of claim 28, wherein the processor is configured to enable current flow through the first internal load for a predetermined period of time.

30. The device of claim 29, wherein the predetermined period of time occurs a predetermined interval of time after a voltage zero crossing.

31. The device of claim 28, wherein the first internal load includes a trip solenoid that causes the circuit interrupting assembly to enter the tripped state in response to the trip signal.

32. The device of claim 28, wherein the device further includes a second internal load, such that the current sensor generates a current signal in response to second internal load current but only when the source voltage is connected to the plurality of load terminals.

33. The device of claim 1, wherein the circuit interrupter includes isolating contacts that disconnect one or more sets of the plurality of line terminals from the plurality of load terminals when the circuit interrupter is in the tripped state.

34. The device of claim 1, wherein the miswire detection circuit includes isolating contacts that disconnect one or more sets of the plurality of line terminals from the plurality of load terminals when the miswire detection circuit detects that source voltage has been connected to the plurality of load terminals.

35. The device of claim 1, wherein the miswire detection circuit includes an indicator that visibly and/or audibly indicates when the miswire detection circuit detects that source voltage has been connected to the plurality of load terminals.

36. The device of claim 1, wherein the detected condition includes a ground fault condition, an arc fault condition, a grounded neutral condition, a miswire fault condition, and/or a simulated test fault condition.

37. A method for wiring a protective device in an electrical circuit, the protective device including a plurality of line terminals coupled to a plurality of load terminals by way of at least one conductive path, the method comprising:
   (a) connecting the plurality of load terminals to source voltage;
   (b) monitoring signal propagation characteristics on the at least one conductive path, the step of monitoring commencing each time source voltage is applied to the plurality of load terminals;
   (c) generating a miswire trip signal based on a predetermined signal propagation characteristic; and
   (d) introducing an electrical discontinuity in the at least one conductive path in response to the trip signal.

38. The method of claim 37, further comprising:
   (e) resetting the protective device, whereby electrical continuity in the at least one conductive path is restored;
   (f) monitoring the signal propagation characteristics;
   (g) generating the miswire trip signal based on a predetermined signal propagation characteristic;
   (h) introducing an electrical discontinuity in the at least one conductive path in response to the miswire trip signal; and
   (i) repeating steps (e)-(i) until the plurality of load terminals are disconnected from the source voltage.

39. The method of claim 37, further comprising:
   (j) connecting the plurality of line terminals to the source voltage;
   (j) disabling steps (a) through (d) after a predetermined time interval elapses.

* * * * *